(No Model.)
H. J. REMMERT.
GAS WASHER.
No. 426,327. Patented Apr. 22, 1890.
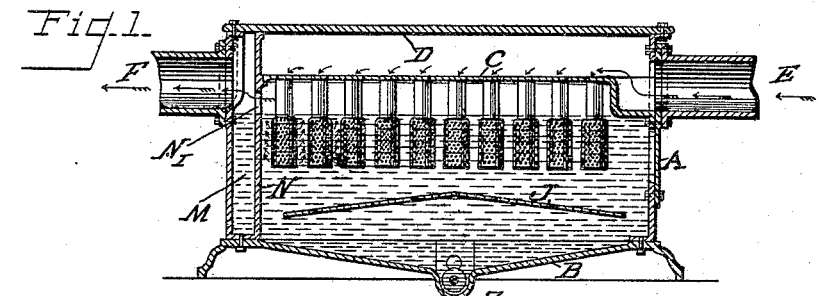
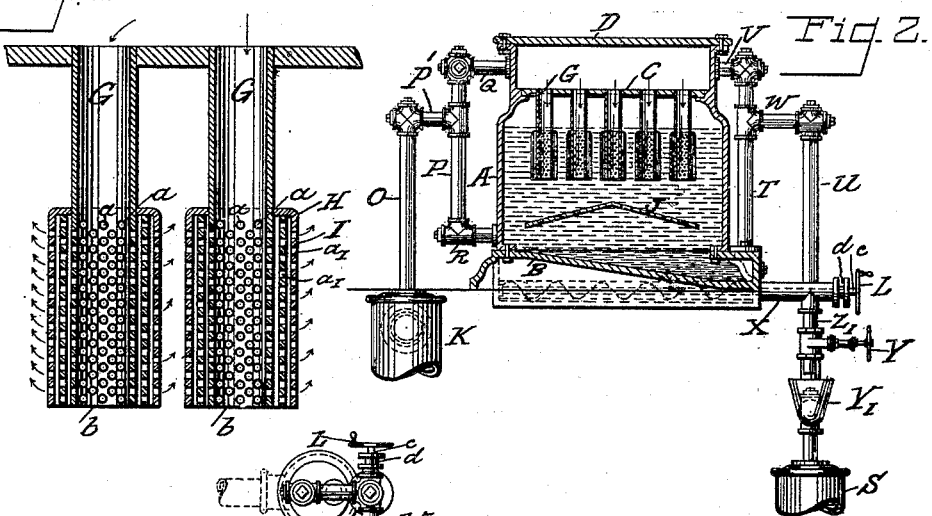
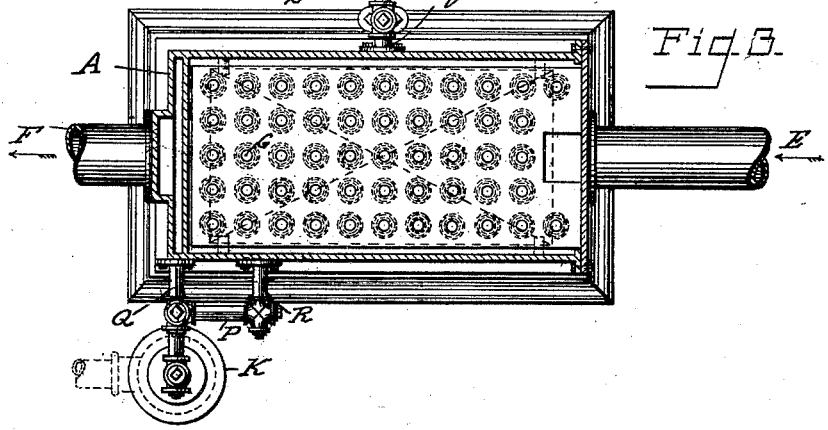
WITNESSES:
Geo. G. Penney.
E. W. Clark
INVENTOR
Herman J. Remmert
By E. B. Clark
ATTORNEY

UNITED STATES PATENT OFFICE.

HERMAN J. REMMERT, OF FORT WAYNE, INDIANA.

GAS-WASHER.

SPECIFICATION forming part of Letters Patent No. 426,327, dated April 22, 1890.

Application filed June 16, 1888. Serial No. 277,339. (No model.)

*To all whom it may concern:*

Be it known that I, HERMAN J. REMMERT, a citizen of the United States, residing at Fort Wayne, in the county of Allen and State of Indiana, have invented certain new and useful Improvements in Gas-Washers; and I do hereby declare the following to be a full, clear, and exact description of the invention, such as will enable others skilled in the art to which it appertains to make and use the same.

My invention relates to a decarbonating washer and tar-extractor to be used in connection with the manufacture and purification of coal-gas; and the objects of my invention are, first, to provide means for successfully removing the carbonic acid and tar from the crude gas coming from the retorts prior to passing it to the scrubbers; second, to provide a continuous supply of decarbonizing-fluid of uniform strength and constant liquid-level whatever the gas-pressure may be; third, to provide an extended and tortuous wetted surface for bringing the gas in contact with the liquid in order to facilitate the absorption of the carbonic acid and the breakage of the tar bubbles; fourth, to provide means for automatically varying the extent of said wetted surface in direct proportion to the pressure and quantity of entering gas to be treated; fifth, to provide a barrier between the accumulation of tar in the lower part of the apparatus and the main body of the purifying-liquid; sixth, to provide ready means for removing said accumulations from the apparatus. I accomplish these objects by the mechanism illustrated in the accompanying drawings, in which—

Figure 1 is a vertical central longitudinal section through the apparatus. Fig. 2 is a vertical cross-section of the same, showing the external connecting devices intact; and Fig. 3 is a plan of the same. Fig. 4 is an enlarged detail view of a part of the same.

Similar letters refer to similar parts throughout the several views.

A is the outer shell of the apparatus, which is in the form of a closed box, the bottom B of which deepens toward the center.

C is a partition-plate arranged some distance below the top D of the box.

E is the inlet-pipe, which conducts the gas to the apparatus and which may be located anywhere above the partition-plate.

F is the outlet-pipe leading the purified gas to the scrubber or lime-purifier.

The partition-plate C is perforated with numerous openings, into which tubes G are fitted gas-tight. The lower portions of these tubes are provided with numerous openings $a$, of any desired form, and are open at the bottom $b$. Surrounding these tubes are other "jacket-tubes," as H I, of which there may be any desired number and the outer one of which is flanged over at the top, so as to seal each jacket-tube at the top. These jacket-tubes are also provided with perforations similar to those in pipes G, and all the perforations are located so as to "break joint" with those of the neighboring tubes.

J is a deflecting-plate, made convex on its upper surface or double inclined and arranged below the tubes and extending to within a short distance of the walls of the box A.

K is a receiver, into which the strong ammoniacal liquor from the scrubber is delivered on its way to space M within the box A (which is partitioned off by means of a wall N, provided with an opening N') by means of pipes O, P, and R.

Q is a pipe leading from the upper end of pipe P into the gas-space of the box A. Each pipe is provided at the elbows with one or more plugs, as shown, and by means of which the various connections may be regulated or broken and the pipes cleaned.

S is a receptacle for the liquor which has flowed from the box A through pipes T, W, and U.

V is a pipe which enters the gas-space of box A and connects with pipe T. These pipes are also provided with plugs, permitting access for cleaning or disconnecting, as shown.

X is a pipe leading from the lowest portion or trough Z of the bottom B and passes by means of a branch pipe Z', provided with stop-valve Y, to a tar-cup Y'.

L is a crank-handle, by means of which a rod $c$, which passes axially along pipe X through gland and stuffing-box $d$, and which is provided with an endless screw located in the trough Z, is revolved.

It will be noticed that the opening N' and the pipe-joints P' and W are all located in the plane of the liquid-level, which is preserved constant in the apparatus, and that the connections Q and V are merely to act as gas-connections to provide an equality of pressure on the liquid in P and in T U.

The operation of my device is as follows: Gas entering at E passes downward into the tubes G, which are immersed in a strong ammoniacal liquid to a point just above the uppermost perforations, and thence through the various perforations in the several tubes and their perforated jackets, and thus comes into intimate contact with said liquor, which absorbs the carbonic acid contained in the gas, and at the same time the globules of tar in the gas come into contact with the several tubes and drop to the plate J, whence they pass to and accumulate in the trough Z. No matter what the pressure of gas may be the liquid-level will be maintained constantly, owing to the action of the pressure-equalizing-pipes, and consequently the greater the pressure of the gas the deeper it will penetrate the tubes, and the liquor and the gas will be cleaned to a uniform degree, notwithstanding the greater flow. As the gas emerges from the outer tube-jacket and the liquor it will spray the liquid against the upper portions of the tubes, and thus constitute them a further wetted surface for the absorption of the carbonic acid and for the breaking of tarry bubbles. The gas then passes through opening N' into the outlet-pipe F and toward the scrubbers. A constant circulation of the liquor is maintained, and the greater the gas-pressure the more rapid will be the circulation, thus keeping the liquor in a strong active condition at all times and in quantity proportional to the work required of it.

By revolving crank-handle L and opening valve Y the accumulated tar is led off. The deflector J serves to prevent a constant stirring up of the tarry accumulation by the action of the gas and the flow of liquor and confines the heavier liquors to the lower part of the vessel. By making use of the various cocks the rate of circulation of the liquor may be varied.

By freeing the gas of its tarry matters and of its carbonic acid the amount of service which would be otherwise required of the scrubbers will be diminished, and consequently they will not need to be refilled and cleaned so frequently. Therefore the attention demanded and the wear will be less, thus reducing the cost of purifying the gas.

Having now described my invention, what I desire to claim and secure by Letters Patent is—

1. In a gas-washer, the combination of a closed vessel provided with a horizontal partition and the downwardly-extending tubes secured at their tops in said partition and dipping into an absorbing-liquid, and provided with lateral perforations only below the surface of such liquid for causing the gas to pass in fine streams at different depths, according to the pressure, through the purifying-liquid, and a gas-inlet pipe connecting above and a gas-outlet pipe connecting below said partition, substantially as set forth.

2. In a gas-washer, the combination of a closed vessel divided by a horizontal partition, a series of tubes secured in said partition and dipping into an absorbing-liquid, and provided with lateral perforations only below the surface of such liquid, a series of perforated jacket-tubes surrounding the lower portion of said tubes and closed at the top, as described, for causing the gas to pass in fine broken streams at different depths, according to the pressure and quantity, through the purifying-liquid, and a gas-inlet pipe connecting above and a gas-outlet pipe connecting below said partition, substantially as described.

3. In a gas-washer, the combination of a closed washing and absorbing tank divided by a horizontal partition, said partition being provided with vertical dip-tubes, a gas-inlet above and a gas-outlet below said partition, a tar-deflecting plate arranged below said tubes, and an inclined tank-bottom terminating in a tar-collecting trough, substantially as described.

4. In an absorbing-tank for a gas-washer provided with a horizontal partition, dip-tubes entering said partition, a gas-inlet above and a gas-outlet below said partition, and a tar-deflecting plate below the dip-tubes, in combination with an inclined tank-bottom and tar-collecting trough and a mechanical cleaner located in said trough, substantially as described.

5. In an absorbing-tank for a gas-washer provided with a horizontally-dividing partition, a gas-inlet above said partition, perforated tubes opening through said partition and depending into the liquid-space below the partition, and a gas-outlet above the liquid-space, in combination with a pipe connecting the gas-space with the liquid-inlet pipe for said tank and a pipe connecting the gas-space with the liquid-outlet pipe of said tank, whereby a circulation of liquid of uniform absorbing power and quantity proportionate to the gas-pressure is automatically maintained, substantially as described.

In testimony whereof I affix my signature in presence of two witnesses.

HERMAN J. REMMERT.

Witnesses:
EDGAR D. ROGERS,
G. L. HACKINS.